United States Patent
Abusleme et al.

(10) Patent No.: US 7,745,513 B2
(45) Date of Patent: Jun. 29, 2010

(54) FLUOROPOLYMER COMPOSITIONS AND INORGANIC NANOMETRIC PARTICLES

(75) Inventors: Julio A. Abusleme, Varese (IT); Aldo Sanguineti, Milan (IT); Claudia Manzoni, Bologna (IT)

(73) Assignee: Solvay Solexis S.p.A., Milan (IT)

( * ) Notice: Subject to any disclaimer, the term of this patent is extended or adjusted under 35 U.S.C. 154(b) by 1042 days.

(21) Appl. No.: 10/453,927

(22) Filed: Jun. 4, 2003

(65) Prior Publication Data

US 2003/0228463 A1 Dec. 11, 2003

(30) Foreign Application Priority Data

Jun. 4, 2002 (IT) .......................... MI2002A1202

(51) Int. Cl.
C08J 3/215 (2006.01)
C08K 3/34 (2006.01)
C08L 27/12 (2006.01)

(52) U.S. Cl. .................. 523/334; 524/445; 524/544

(58) Field of Classification Search ................ 523/334; 524/445, 544
See application file for complete search history.

(56) References Cited

U.S. PATENT DOCUMENTS

| | | | | |
|---|---|---|---|---|
| 2,891,921 A * | 6/1959 | Kumnick et al. | ............. | 524/166 |
| 3,592,834 A * | 7/1971 | Buckman et al | ............ | 556/410 |
| 4,038,244 A * | 7/1977 | Ogden et al. | ................ | 524/142 |
| 4,440,879 A * | 4/1984 | Kawachi et al. | ............. | 523/200 |
| 4,839,221 A * | 6/1989 | Asaumi et al. | ............... | 442/376 |
| 4,864,006 A | 9/1989 | Giannetti et al. | | |
| 4,881,794 A * | 11/1989 | Bartoszek | ................... | 385/102 |
| 5,310,775 A | 5/1994 | Sibilia et al. | | |
| 5,498,680 A | 3/1996 | Abusleme et al. | | |
| 5,562,991 A * | 10/1996 | Tannenbaum | ............... | 428/421 |
| 5,840,796 A | 11/1998 | Badesha et al. | | |
| 5,959,026 A | 9/1999 | Abusleme et al. | | |
| 5,962,553 A | 10/1999 | Ellsworth | | |
| 6,103,843 A | 8/2000 | Abusleme et al. | | |
| 6,107,393 A | 8/2000 | Abusleme et al. | | |
| 6,218,000 B1 | 4/2001 | Rudolf et al. | | |
| 6,392,569 B1 | 5/2002 | Mimachi et al. | | |
| 6,787,592 B1 * | 9/2004 | Powell et al. | ................ | 524/445 |
| 6,797,760 B1 * | 9/2004 | Ebrahimian et al. | ......... | 524/445 |
| 6,863,852 B1 * | 3/2005 | Ballard et al. | ................ | 264/112 |
| 7,193,015 B1 * | 3/2007 | Mabry et al. | ................. | 525/101 |

FOREIGN PATENT DOCUMENTS

| | | |
|---|---|---|
| EP | 1 067 146 | 1/2001 |
| JP | 4085355 A2 | 3/1992 |
| JP | 2000-204214 A | 7/2000 |
| WO | WO 98/10012 | 3/1998 |
| WO | WO 99/07781 | 2/1999 |

* cited by examiner

*Primary Examiner*—Tae H Yoon
(74) *Attorney, Agent, or Firm*—Arent Fox LLP

(57) ABSTRACT

A polymeric composition comprising:
a) from 90 to 99.9% by weight of a continuous fluoropolymer matrix; and homogeneously dispersed
b) from 0.1 to 10% by weight of lamellar inorganic particles having at least one dimension lower than 100 nm
having improved elastic modulus and "storage modulus" G' at high temperatures.

12 Claims, No Drawings

FLUOROPOLYMER COMPOSITIONS AND INORGANIC NANOMETRIC PARTICLES

The present invention relates to fluoropolymers having improved elastic modulus, "storage modulus" G' and yield stress at room temperature and even at high temperatures, higher than 100° C., maintaining the good chemical and thermal resistance properties typical of fluoropolymers.

In the case of thermoprocessable fluoropolymers the addition of reinforcing fillers does not bring any substantial improvement of the polymer tensile properties (see the comparative Examples).

Thermoplastic fluorinated polymers having improved elastic modulus at room temperature containing lamellar silicate particles having nanometric sizes, are known from U.S. Pat. No. 5,962,553. Said polymers are obtained by adding thereto various types of layered silicates modified with intercalating compounds that allow their exfoliation into lamellar particles having a nanometric thickness. Said intercalating compounds are organophosphonium compounds capable to substitute the Na cations of the silicate leading to a modified layered silicate. Said modified silicate in powder form is mixed with the fluoropolymer in powder and the mixture is melted under mechanical stress, obtaining the exfoliation of the modified silicate inside the fluoropolymer matrix. However the above process shows the drawback of requiring the presence of high amounts of organic intercalating compounds in the fluoropolymer, causing a reduced chemical and/or thermal resistance thereof.

The need was felt to have available fluoropolymers having improved elastic modulus, "storage modulus" G' and yield stress at room temperature and especially at high temperatures, higher than 100° C., contemporaneously maintaining the good chemical and thermal resistance properties of fluoropolymers.

The Applicant has unexpectedly and surprisingly found that it is possible to prepare fluoropolymers having the above properties.

An object of the present invention is a polymeric composition comprising:
a) from 90 to 99.9% by weight of a fluoropolymer; and homogeneously dispersed,
b) from 0.1 to 10% by weight of lamellar inorganic particles having at least one dimension lower than 100 nm.

In particular b) is formed by lamellar particles having a thickness lower than 100 nm, preferably lower than 50, more preferably lower than 10, and the other two dimensions lower than 10,000 nm, preferably lower than 2,000, more preferably lower than 500 nm.

As fluoropolymers a) it can be mentioned, for example:
1) tetrafluoroethylene homopolymer (PTFE), or tetrafluoroethylene (TFE) copolymers with less than 0.5% by moles of other fluorinated monomers, for example perfluoroalkylvinylethers (PAVE), perfluorodioxoles;
2) semicrystalline thermoplastic TFE copolymers with amounts higher than or equal to 0.5% by moles of fluorinated monomers, such for example perfluoroalkylvinylethers (PAVE), perfluorodioxoles, fluorosulphonyl(per)fluoroalkyl vinylether, hexafluoropropene (HFP);
3) chlorotrifluoroethylene homopolymer (PCTFE) and semicrystalline thermoplastic copolymers of chlorotrifluoroethylene (CTFE) with amounts in the range 0.1-5% by moles of fluorinated monomers, such for example PAVE, perfluorodioxoles, or with acrylic monomers described in U.S. Pat. No. 6,392,569;
4) semicrystalline thermoplastic copolymers of ethylene (E) with CTFE and/or TFE, optionally containing one or more fluorinated monomers such for example PAVE, perfluorodioxoles, or acrylic monomers described in U.S. Pat. No. 6,107,393;
5) polivinylidenefluoride (PVDF) or semicrystalline thermoplastic copolymers of vinilydenefluoride (VDF) containing between 0.1% and 10% of one or more fluorinated monomers, such for example HFP, TFE, CTFE, trifluoroethylene, PAVE and perfluorodioxoles;
6) elastomeric VDF copolymers with one or more fluorinated monomers, as HFP, TFE, optionally containing olefinic monomers as ethylene (E), propylene, PAVE, or "cure-site" monomers containing bromine or iodine atoms;
7) elastomeric TFE copolymers with perfluoroalkylvinylether or perfluorooxyalkylvinylether, optionally containing ethylene (E) or propylene and "cure-site" monomers containing bromine or iodine atoms.

The fluoropolymer a) is preferably a semicrystalline fluoropolymer having a second melting temperature lower than 310° C., more preferably selected in classes 3) and 4).

The lamellar inorganic particles b) are preferably formed by silicates, more preferably aluminum-silicates and/or magnesium-silicates containing other metals such as sodium, potassium, iron or lithium. As inorganic precursor of particle b) having a layered lamellar morphology can be mentioned: smectic clays formed by silicates, more preferably aluminum-silicates and/or magnesium-silicates containing other metals such as sodium, potassium, iron or lithium. Examples of smectic clays are natural minerals called montmorillonite, sauconite, vermiculite, hectorite, saponite, nontronite, or synthetic clays, for example, fluorohectorite, laponite (magnesium-silicate).

Preferably the lamellar inorganic particles b) have at least one dimension lower than 50 nm, more preferably lower than 10 nm.

The polymeric composition preferably contains from 0.3 to 6% by weight of said lamellar inorganic particles b).

A further object of the invention is the process for obtaining the above composition, comprising:
1) preparation of an aqueous fluoropolymer latex having a concentration between 5 and 60% by weight, preferably between 15 and 30% by weight of fluoropolymer;
2) preparation of an aqueous dispersion of lamellar inorganic particles having a thickness lower than 100 nm, preferably lower than 50 nm, more preferably lower than 10, and the other two dimensions lower than 10,000 nm, preferably lower than 2,000, more preferably lower than 500 nm, by mixing the inorganic component having a layered lamellar morphology with water until obtaining a concentration comprised between 0.1 and 10% by weight, preferably between 0.5 and 2%, under stirring (a strong mechanical stirring and/or an ultrasound treatment), at a temperature in the range 20° C.-300° C., preferably 50° C.-100° C.;
3) mixing under stirring the latex obtained in 1) with the aqueous dispersion obtained in 2);
4) precipitation of the solid phase from the aqueous mixture obtained in 3) by cooling at temperatures lower than 0° C. or by increasing the ionic strength or by pH variations;
5) separation and drying at temperatures from 50° C. to 250° C. of the solid phase obtained in 4).

In step 2) the stirring is preferably a strong mechanical stirring and/or an ultrasound treatment.

The latex 1) is prepared by aqueous emulsion polymerization of fluorinated monomers, preferably in the presence of a surfactant or of an aqueous microemulsion based on (per)fluoropolyethers.

When the concentration of the latex prepared in 1) is lower than 30% it is possible to directly add to said latex the inorganic component having a layered lamellar morphology, thus avoiding step 2).

With "microemulsion" it is meant a thermodynamically stable oil/water (O/W) system formed by a mixture of water, a fluorinated surfactant and an oil phase based on (per)fluoropolyether, which appears as a clear solution. See for example U.S. Pat. No. 4,864,006, U.S. Pat. No. 5,498,680, U.S. Pat. No. 5,959,026 and U.S. Pat. No. 6,103,843.

The latex fluoropolymer particles have dimensions comprised between 20 and 300 nm, preferably between 50 and 150 nm. Said latexes are obtained by controlling the surfactant amount used in the polymerization and/or the monomer conversion. For example, at equal conversion, by reducing the surfactant, latex particles having larger dimensions are obtained; at equal surfactant content, a conversion decrease leads to a reduction of the particle size of the latex.

As inorganic components having a layered lamellar morphology are used those previously defined.

The invention process leads to a fluoropolymer powder in which the lamellar inorganic particles are homogeneously dispersed.

Therefore the invention powders are obtainable by mixing a fluoropolymer latex with an aqueous dispersion of the lamellar inorganic component (step 2), and then by carrying out the further process steps. In process step 2) the inorganic particles are exfoliated as it can be seen by the AFM analysis (see the characterization method of the Examples). The thickness can reach the monolamellar level or there can be overlapping of some lamellas. By AFM analysis thicknesses from 1 to 2 nm are noticed. The largest particle dimension is about 400 nm for the montmorillonite and about 50 nm for the laponite. By AFM analysis the skilled man in the art is able to determine the inorganic particle dimensions.

The invention composition powders can be compression moulded or extruded to give shaped articles as sheets, pipes, films.

A further object of the present invention is an aqueous mixture comprising from 5% to 90% by weight of:
I) fluoropolymer a) particles having dimensions in the range 20-300 nm; and
II) lamellar inorganic particles b) having at least one dimension lower than 100 nm, wherein the ratio by weight between the fluoropolymer and the lamellar inoganic component is in the range 1-1,000. For example said mixture may contain from 0.1 to 10% by weight of inorganic particles II) referred to the sum I)+II).

Said aqueous mixture is obtainable according to the sequence of steps 1), 2) and 3) of the invention process. Said aqueous mixture can be used to obtain a continuous and homogeneous polymeric film or coatings by water evaporation.

Some Examples follow for illustrative purposes and are not limitative of the present invention.

EXAMPLES

The following characterizations carried out on the components of the Examples are hereinafter listed:
Melt Flow Index (M.I.)
The M.I. of the fluorinated polymers is measured according to the ASTM D 1238 method;
Second melting temperature ($T_{mII}$) and crystallization temperature ($T_{xx}$)

The $T_{mII}$ and the $T_{xx}$ of the fluorinated polymers are determined by differential scanning calorimetry (DSC);
Dynamic-mechanical measurements (DMS)
They have been carried out according to the ASTM D 4065 method by using a Rheometric ARES dynamic-mechanical spectrometer having a Temperature ramp of about +2° C./min and a constant frequency equal to 6.28 rad/sec. With said measurement the "Storage Modulus" G' is obtained in function of the temperature;
Mechanical properties
At 23° C. and at 100° C. according to the ASTM D 1708 method, on compression moulded plaques;
DLLS (Dynamic Laser Light Scattering)
The polymer latex particle diameter values have been obtained according to the Photon Correlation Spectroscopy technique, or so called Dynamic light scattering (B. Chu, "Laser Light Scattering", Academic Press, New York, 197-4), by an instrument produced by Brookhaven Scientific Instrument and composed by the BI9000 correlator and by the BI200SM goniometer. The used light source is an argon ion laser Spectra Physics (wave length 514.5 nm).
Optical microscope
The optical microscopy analyses have been carried out with a Zeiss microscope.
X-ray
The low angle X ray scattering measurements have been obtained by a Kratky chamber, by using the copper Kα radiation (1.54 Angstrom). The intensity data have been collected by a positional detector Mbraun OED-50M in the angular range 0.1-5° (2θ).
Atomic Force Microscopy (AFM-Atomic Force Microscopy)
The analyses have been carried out by a Park Autoprobe microscope in a No Contact mode on a layer obtained by the lamellar inorganic component dispersion diluted in water to 0.1% by weight concentration, deposited on mica and dryed.
Granulometry
The granulometry measurements of the inorganic component have been carried out by riddling the powder through Endecotts sieves having different mesh sizes, comprised between 600 and 75 micron, subjecting the powder to mechanical vibration (frequency 7) for 10 minutes.

EXAMPLES

Example 1

A) Polychlorotrifluoroethylene (PCTFE) Latex

A PCTFE homopolymer latex has been prepared according to patent EPA 1,067,146;
In an enamelled autoclave equipped with enamelled baffles and stirrer working at 300 rpm there were introduced in sequence:
8.21 of demineralized water;
112.5 g of a microemulsion formed by: 20% by weight of Galden® D02, having formula:

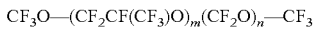

having m/n=20 and average molecular weight of 450;
40% by weight of a surfactant having formula:

having m1/n1=82.7 and average molecular weight of 527; and 40% by weight of demineralized water;

4 kg of chlorotrifluoroethylene.

Then the autoclave was heated to the reaction temperature of 60° C. and the radical initiator under the form of a solution of 19 g of potassium persulphate dissolved in 800 g of demineralized water was introduced.

When the working pressure decreased by 50% with respect to its initial value, i.e. after 290 minutes of reaction, the autoclave was vented and the latex discharged at room temperature.

The obtained latex was diluted with demineralized water to a concentration of 215.2 g of polymer for kg of latex. The latex particles average diameter, measured by DLLS, was 84 nm.

B) Montmorillonite Dispersion

A montmorillonite dispersion was prepared by using a sodium montmorillonite (MMT), sold as Cloisite Na+ (CAS No. 1318-93-0) by the Southern Clay company, having the following particle distribution:

27.7%>600 micron, 31.8% in the range 500-250 micron, 36.6% in the range 250-106 micron, 3.9%<75 micron.

10 g of MMT were dispersed in 200 g of demineralized water under strong mechanical stirring and subsequent ultrasound treatment.

The lamellar inorganic particles have an average thickness of about 2 nm and an average length of 400 nm measured by AFM (Atomic Force Microscopy).

C) Preparation of the Polymeric Composition Containing MMT

In a 2 litre flask 1.5 kg of the PCTFE latex prepared in A) and the MMT dispersion prepared in B) were mixed. After stirring an aqueous mixture containing 19.5% by weight of solid was obtained. Then the solid phase was precipitated by cooling at a temperature of −20° C., separated by filtration and dried at 175° C. for 16 hours obtaining a powder.

The powder is constituted by 97% by weight of PCTFE and by 3% by weight of MMT, and has a Melt Flow Index (MI), determined at 265° C. with a 10 kg load, equal to 2.7 g/10'.

A compression moulded specimen from said powder has a modulus G' at 150° C. as reported in Table 1, and $T_{mII}$ and $T_{xx}$, determined with a scanning rate of 40° C./min, as reported in Table 2.

Example 2

Comparative 1.5 kg of the PCTFE latex of Example 1 were precipitated by cooling at temperature of −20° C., the product has been separated and dried at 175° C. for 16 hours obtaining a powder.

The obtained product has a Melt Flow Index (MI), determined at 265° C. with a 10 kg load, equal to 41.5 g/10'.

A compression moulded specimen from said powder has a modulus G' at 150° C. as reported in Table 1, and $T_{mII}$ and $T_{xx}$, determined with a scanning rate of 40° C./min, as reported in Table 2.

Example 3

Comparative 48.5 g of PCTFE powder of Example 2 (comparative) were mixed with 1.5 g of MMT powder, thus obtaining a blend formed by 97% by weight of PCTFE and 3% by weight of MMT.

A compression moulded specimen from said powder has a modulus G' at 150° C. as reported in Table 1, and $T_{mII}$ and $T_{xx}$, determined with a scanning rate of 40° C./min, as reported in Table 2.

It is possible to notice visually or by optical microscope the presence of MMT particles having the same dimension of the used MMT powder.

Example 4

A) Ethylene/Chlorotrifluoroethylene Latex Having Molar Composition 40/60 (ECTFE)

In an enamelled autoclave equipped with enamelled baffles and stirrer working at 300 rpm there were introduced in sequence:

8.2 l of demineralized water;

112.5 g of a microemulsion formed by: 20% by weight of Galden® D02, having formula:

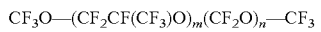

having m/n=20 and average molecular weight of 450; 40% by weight of a surfactant having formula:

having m1/n1=82.7 and average molecular weight of 527; 40% by weight of demineralized water;

25 g of chloroform;

4 kg of chlorotrifluoroethylene.

Then the autoclave was heated to the reaction temperature of 60° C. and ethylene was introduced up to a pressure of 21.4 absolute bar. The radical initiator under the form of a solution of 4.8 g of potassium persulphate dissolved in 800 g of demineralized water was then introduced in the autoclave.

The pressure was maintained constant during the whole polymerization by continuously feeding ethylene in the reactor up to a consumption of 230 g. Then the autoclave was vented and the latex discharged at room temperature.

The obtained latex was diluted with demineralized water to a concentration of 160.1 g of polymer for kg of latex. The latex particles average diameter, determined by DLLS, was 94 nm.

B) Laponite Dispersion

A synthetic hectorite dispersion was prepared by using a hectorite, sold as Laponite RD by the LAPORTE company, having the following particle distribution:

0.7%>600 micron, 7.3% in the range 500-250 micron, 52.6% in the range 250-106 micron, 39.4%<75 micron.

51 g of Laponite were dispersed in 5.1 kg of demineralized water under strong mechanical stirring obtaining a transparent dispersion.

The lamellar inorganic particles have an average thickness of about 1 nm and an average length of 50 nm measured by AFM (Atomic Force Microscopy).

C) Preparation of the Polymeric Composition Containing Laponite

In a 10 litre flask 5 kg of the ECTFE latex prepared in A) and the Laponite dispersion prepared in B) were mixed.

After stirring an aqueous mixture containing 8.5% by weight of solid was obtained. Then the solid phase was precipitated by cooling at a temperature of −20° C., separated by filtration and dried at 120° C. for 16 hours obtaining a powder.

The powder is constituted by 94% by weight of ECTFE and 6% by weight of Laponite, and has a Melt Flow Index (MI), measured at 210° C. with a 10 kg load, equal to 0.36 g/10'.

A compression moulded specimen from said powder has modulus G' values at 23° C., 100° C. and 125° C. as reported in Table 3, and $T_{mII}$ and $T_{xx}$, measured with a scanning rate of 10° C./min, as reported in Table 4.

The mechanical properties measured at 100° C. are reported in Table 6.

The X ray analysis on a compression moulded specimen from said powder shows that the dimensions of the inorganic particles are lower than 50 nm.

Example 5

A) Ethylene/Chlorotrifluoroethylene Latex Having Molar Composition 40/60 (ECTFE)

The ECTFE latex of Example 4 was used.

B) Montmorillonite Dispersion

The sodium montmorillonite (MMT) of Example 1 was used.

25 g of MMT were dispersed in 2.5 kg of demineralized water by strong mechanical stirring.

The lamellar inorganic particles have an average thickness of about 2 nm and an average length of 400 nm measured by AFM (Atomic Force Microscopy).

C) Preparation of the Polymeric Composition Containing Montmorillonite

In a 10 litre flask 5 kg of the ECTFE latex and the MMT dispersion prepared in B) were mixed.

After stirring, an aqueous mixture containing 11% by weight of solid was obtained. Then the solid phase was precipitated by cooling at a temperature of −20° C., separated by filtration and dried at 120° C. for 16 hours obtaining a powder.

The powder is constituted by 97% by weight of ECTFE and 3% by weight of MMT, and has a Melt Flow Index (MI), measured at 210° C. with a 10 kg load, equal to 1.0 g/10'.

A compression moulded specimen from said powder has modulus G' values at 23° C., 100° C. and 125° C. as reported in Table 3, and $T_{mII}$ and $T_{xx}$, measured with a scanning rate of 10° C./min, as reported in Table 4.

The mechanical properties measured at 23° C. and at 100° C. are respectively reported in Tables 5 and 6.

Example 6

Comparative 5 kg of the ECTFE latex of Example 4 were precipitated by cooling at a temperature of −20° C., the compound was separated by filtration and dried at 120° C. for 16 hours obtaining a powder.

The obtained powder has a Melt Flow Index (MI), measured at 210° C. with a 10 kg load, equal to 8.2 g/10'.

A compression moulded specimen from said powder has modulus G' values at 23° C., 100° C. and 125° C. as reported in Table 3, and $T_{mII}$ and $T_{xx}$, determined with a scanning rate of 10° C./min, as reported in Table 4.

The mechanical properties measured at 23° C. and at 100° C. are respectively reported in Tables 5 and 6.

Example 7

The aqueous mixture containing 8.5% by weight of solid obtained in Example 4 C), was used to obtain a film by "spin coating" on a mica surface. The film, after drying, is continuous and uniform.

Example 8

Comparative

A powder of an ethylene/chlorotrifluoroethylene copolymer having molar composition 50/50 (ECTFE), having a Melt Flow Index (MI), measured at 275° C. with a 2.16 kg load, equal to 7.0 g/10' and a $T_{mII}$ of 240° C., determined with a scanning rate of 10° C./min, was compression moulded obtaining a specimen. The mechanical properties measured at 23° C. are reported in Table 7.

The powder of the same ECTFE polymer was mixed with mica powder (coated with titanium oxide) IRIODIN® 123 by MERCK, having a particle size in the range 5-25 micron, obtaining a mixture of powders formed by 97% by weight of ECTFE and by 3% of mica, from which a specimen was compression moulded.

The mechanical properties measured at 23° C. compared with those of ECTFE not filled with mica, are reported in Table 7.

As it is shown in Table 7, the filled ECTFE does not show an improvement of the tensile properties compared with the non-filled ECTFE, except for a slight increase of the elastic modulus. In general a worsening of the tensile properties of the filled ECTFE with respect to the non-filled ECTFE is noticed.

TABLE 1

| "Storage Modulus"G' (MPa) | Example 1 | Example 2 (comp.) | Example 3 (comp.) |
|---|---|---|---|
| at 150° C. | 200 | 80 | 80 |

TABLE 2

|  | Example 1 | Example 2 (comp.) | Example 3 (comp.) |
|---|---|---|---|
| $T_{mII}$ (° C.) | 213.8 | 215.0 | 215.0 |
| $T_{xx}$ (° C.) | 188.0 | 173.9 | 176.9 |

TABLE 3

| "Storage Modulus"G' (MPa) | Example 4 | Example 5 | Example 6 (comp.) |
|---|---|---|---|
| at 23° C. | 691 | 741 | 533 |
| at 100° C. | 21.6 | 19.3 | 10.0 |
| at 125° C. | 13.9 | 13.0 | 6.8 |

TABLE 4

|  | Example 4 | Example 5 | Example 6 (comp.) |
|---|---|---|---|
| $T_{mII}$ (° C.) | 157.4 | 158.3 | 160.6 |
| $T_{xx}$ (° C.) | 141.0 | 144.2 | 141.0 |

TABLE 5

| Mechanical properties at 23° C. | Example 5 | Example 6 (comp.) |
|---|---|---|
| Elastic Modulus (MPa) | 1413 | 1074 |
| Yield stress (MPa) | 27.4 | 24.0 |
| Elongation at break (%) | 269 | 270 |

TABLE 6

| Mechanical properties at 100° C. | Example 4 | Example 5 | Example 6 (comp.) |
|---|---|---|---|
| Elastic Modulus (MPa) | 43 | 29 | 16 |
| Yield stress (MPa) | 2.9 | 2.7 | 1.9 |
| Stress at break (MPa) | 3.0 | 2.7 | 2.7 |
| Elongation at break (%) | 363 | 399 | 763 |

TABLE 7

|  | Example 8 (comp.) | |
|---|---|---|
| Mechanical properties at 100° C. | ECTFE + 3% mica | ECTFE |
| Elastic modulus (MPa) | 1598 | 1480 |
| Yield stress (MPa) | 27 | 32 |
| Stress at break (MPa) | 44 | 55 |
| Elongation at break (%) | 178 | 240 |

The invention claimed is:

1. A process for manufacturing a polymeric composition comprising:
   a) from 90 to 99.9% by weight of a fluoropolymer; and homogeneously dispersed
   b) from 0.1 to 10% by weight of non-modified lamellar inorganic particles having a thickness lower than 100 nm, said process comprising the steps of:
   1) preparing an aqueous fluoropolymer latex having a concentration between 5 and 60% by weight of fluoropolymer;
   2) preparing an aqueous dispersion of lamellar inorganic particles having a thickness lower than 100 nm, and the other two dimensions lower than 10,000 nm by mixing an inorganic component having a layered lamellar morphology with water until obtaining a concentration comprised between 0.1 and 10% by weight under stirring at a temperature in the range 20° C.-300° C.
   3) mixing, under stirring, the latex obtained in step 1) with the aqueous dispersion obtained in step 2) wherein the ratio by weight of the fluoropolymer to the lamellar inorganic component is in a range of 1:1-1000:1;
   4) effecting precipitation of a solid phase from the aqueous mixture obtained in step 3) by cooling at a temperature lower than 0° C. to -20° C. or by increasing the ionic force or by pH variations; and
   5) separating and drying at temperatures from 50° C. to 250° C. the solid phase obtained in step 4) to obtain the polymeric composition.

2. The process according to claim 1, wherein the fluoropolymer of the latex in the form of particles has dimensions between 20 and 300 nm.

3. The process according to claim 1, wherein the fluoropolymer latex in the form of particles has dimensions between 50 and 150 nm.

4. The process according to claim 1, wherein the lamellar inorganic particles have a thickness lower than 50 nm.

5. The process according to claim 1, wherein the other two dimensions of the lamellar inorganic particles are lower than 2000 nm.

6. The process of claim 1, wherein the inorganic component having a layered lamellar morphology is mixed with water until obtaining a concentration between 0.5 and 2%.

7. The process of claim 1, wherein mixing the inorganic component having a layered lamellar morphology with water under stirring is performed at a temperature in the range 50° C.-100° C.

8. The process of claim 1, wherein the stirring is at least one of a strong mechanical stirring and an ultrasound treatment.

9. The process of claim 1, wherein the lamellar inorganic particles have a thickness lower than 10 nm.

10. The process according to claim 1, wherein the other two dimensions of the lamellar inorganic particles are lower than 500 nm.

11. The process of claim 1, wherein the fluoropolymer a) is a semicrystalline fluoropolymer having a second melting temperature lower than 310° C.

12. The process of claim 1, wherein the fluoropolymer a) is selected from the group consisting of:
   chlorotrifluoroethylene homopolymer (POTFE) and semicrystalline thermoplastic copolymers of chlorotrifluoroethylene (CTFE) in amounts in the range 0.1-5% by moles of fluorinated monomers or acrylic monomers and semicrystalline thermoplastic copolymers of ethylene (E) with CTFE and/or TFE.

* * * * *